3,422,201
BENZENESULFONYLCARBODIIMIDES AS ANTI-DIABETIC AGENTS

Adnan A. R. Sayigh, North Haven, and Henri Ulrich, Northford, Conn., and John B. Wright, Kalamazoo Township, Kalamazoo County, Mich., assignors to The Upjohn Company, Kalamazoo, Mich., a corporation of Delaware
No Drawing. Original application Jan. 2, 1964, Ser. No. 335,414. Divided and this application Oct. 3, 1966, Ser. No. 583,994
U.S. Cl. 424—321     2 Claims
Int. Cl. A61k 25/00

ABSTRACT OF THE DISCLOSURE

Oral anti-diabetic compositions containing about 15 to 500 milligrams of a benzenesulfonylcarbodiimide together with a pharmaceutically acceptable carrier.

---

This application is a division of U.S. Ser. No. 335,414 filed on Jan. 2, 1964.

The present invention relates to novel unit dosage compositions containing sulfonylcarbodiimides.

The sulfonylcarbodiimides contemplated by the present invention possess the formula:

$$R^1-SO_2-N=C=N-R \quad (I)$$

wherein $R^1$ represents alkyl of one to six carbon atoms, inclusive, e.g., methyl, ethyl, propyl, butyl, isobutyl, pentyl, hexyl, and the like, and

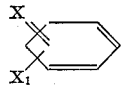

wherein X and $X_1$ represent hydrogen, alkyl of one to four carbon atoms, inclusive, e.g., methyl, ethyl, propyl, isopropyl, butyl, isobutyl, and the like, alkoxy of one to four carbon atoms, inclusive, e.g., methoxy, ethoxy, propoxy, isopropoxy, butoxy, and the like, halogen, e.g., chloro, bromo, fluoro, and the like, and alkanoyl of two to four carbon atoms, inclusive, e.g., acetyl, propionyl, butyryl, and the like. X and $X_1$ can be alike or different. R represents alkyl of one to six carbon atoms, inclusive, e.g., methyl, ethyl, propyl, isopropyl, isobutyl, butyl, 500 milligrams of a benzenesulfonyl carbodiimide tohexyl, and the like, cycloalkyl of five to eight carbon atoms, inclusive, e.g., cyclopentyl, cyclohexyl, cycloheptyl, cyclooctyl, and the like, and

which represents a saturated heterocyclic amino selected from the group consisting of unsubstituted and mono- and polyalkyl substituted piperidino and hexamethyleneimino wherein each alkyl is of one to four carbon atoms, inclusive. Representative saturated heterocyclic amino radicals include, e.g., piperidino, hexamethyleneimino, 2-methylpiperidino, 3-methylpiperidino, 4-methylpiperidino, 2-butylpiperidino, 2-propylpiperidino, 4-isoproylpiperidino, 3,4-diethyliperidino, and the like.

The sulfonylcarbodiimides can be prepared by a novel two-stage reaction of substantially equal molecular amounts of a sulfonylthiourea of the formula:

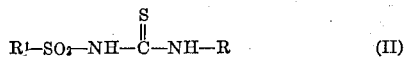

wherein $R^1$ and R are as defined above and an acid halide, e.g., phosgene, phosphorous pentachloride, phosphorus pentabromide, phosphorus trichloride, phosphorus tribromide, thionyl chloride, and the like, the acid chloride being preferred. The two reactants are mixed, preferably in the presence of an inert solvent, under substantially anhydrous conditions, in the presence or absence of an acid acceptor, and at a temperature in the range from about 0° to about 60° C., preferably from about 15° to about 50° C. Thereafter the reaction mixture is heated at a temperature in the range from about 75° to about 200° C., preferably from about 75° to about 150° C.

In carrying out the preparation, it is not essential that the initial reaction mixture or the subsequent first-stage or second-stage reaction mixtures be maintained completely free of all moisture. For example, access of the reaction mixture to the moisture normally present in the atmosphere will not cause a substantial decrease in the amount of sulfonylcarbodiimide ultimately produced. It is desirable, however, to use reactants, reaction solvents, and reaction vessels which are substantially free of water. For example, it is desirable that no more than 0.01 mole of water per mole of acid halide be present in a reaction mixture. Preferably, less water should be present. The presence of more water will decrease the yield of the desired sulfonylcarbodiimide by reacting with the sulfonylcarbodiimide. The reaction as noted above can be carried out in the presence or absence of an acid acceptor. In the event that an acid acceptor is employed, it is preferable to utilize a tertiary amine acid acceptor, e.g., triethylamine. Practically any quantity of acid acceptor can be added without adversely affecting the yield but, preferbly, it is advisable to employ one mole or less per mole of liberated acid.

Although the presence of a reaction solvent is not essential, particularly if the thiourea of Formula II is a liquid at the first-stage reaction temperature, it is usually advantageous to dissolve or suspend the sulfonylthiourea reactant in an inert solvent, and then to add a solution of acid halide in the same or similarly inert solvent. Alternatively, a solvent can be used to dissolve or disperse the thiourea, and the desired amount of acid halide can then be added in gaseous form. Suitable solvents are aromatic hydrocarbons, e.g., benzene, toluene, xylene; aliphatic hydrocarbons, e.g., hexane, heptane, octane, mineral oil; cycloalkanes, e.g., cyclohexane, tetrahydronaphthalene, Decalin; chlorinated hydrocarbons, e.g., chlorobenzene, ethylene dichloride and carbon tetrachloride; dialkyl ethers of ethylene glycol and diethylene glycol, e.g., the dimethyl ethers; dialkyl sulfoxides, e.g., dimethyl sulfoxide, and the like. Especially preferred as reaction solvents are the normally fluid aromatic hydrocarbons and chlorinated hydrocarbons. Important criteria in the choice of a reaction solvent are that the solvent be a liquid over the entire desired reaction temperature range and that the solvent not react with the acid halide or with the desired sulfonylcarbodiimide. In general, solvents should be avoided which contain active hydrogen atoms as determined by the Zerewitinoff procedure [J. Amer. Chem. Soc. 49, 3181 (1927)]. The amount of solvent to be used is not critical, it being desirable, however, that a reasonably fluid reaction mixture be maintained to facilitate contact between the acid halide and the sulfonylthiourea.

It is preferred to react substantially equal molecular amounts of the acid halide and thiourea. Lesser or greater amounts of acid halide will result in smaller yield of the desired sulfonylcarbodiimide. When lesser amounts of acid halide are used, some of the sulfonylthiourea remains unreacted.

The time required for completion of the first and second stages of the reaction vary according to the nature of the sulfonylthiourea reactant. Satisfactory results are usually obtained by a slow mixing of acid halide and the thiourea, for example, during about 20 to about 120 minutes within the relatively low first-stage temperature range. Although the first-stage reaction usually proceeds to completion rapidly, it is desirable to maintain the reaction mixture within the first-stage temperature range for about 5 minutes to about 6 hours before starting the second stage of the reaction. The second stage usually requires heating within the higher temperature range for about 1 to 6 hours.

The second stage can also, if desired, be conducted in the presence of an inert gas, for example, passing nitrogen or helium through the reaction mixture in order to remove undesired reaction products.

The isolation of a sufonylcarbodiimide from a second-stage reaction mixture can be carried out by conventional techniques, for example, by evaporation of the reaction solvent and distillation of the residue at reduced pressure. Alternatively, the sulfonylcarbodiimide can be isolated from said residue by chromatography. If the sulfonylcarbodiimide is normally a solid, it can be isolated and purified by crystallization from a suitable solvent or pair of solvents.

The starting sulfonylthioureas can be prepared according to the procedures outlined in Chem. Rev., 50, 1–46, 1952, and Ber., 83, 551, 1950. For example, the starting sulfonylthioureas can be prepared by reacting sulfonamides in aqueous sodium hydroxide with a substituted isothiocyanate.

The following preparations are illustrative of the preparation of sulfonylcarbodiimides.

EXAMPLE 1

N-benzenesulfonyl-N'-ethylcarbodiimide

To 9.76 g. (0.04 mole) of N-benzenesulfonyl-N'-ethylthiourea in 60 ml. of dry chlorobenzene was added 4 g. (0.04 mole) of phosgene in 40 ml. of dry chlorobenzene dropwise with cooling and stirring over a period of 14 minutes at 5° C. After stirring for 90 minutes at 25° C., the reaction was heated at 132° C. for 50 minutes while nitrogen was passed through the reaction mixture. A small amount of solid material was removed by filtration and upon evaporation of the chlorobenzene 7.8 g. of crude product was obtained. Distillation under reduced pressure produced 4 g. (47.6 percent) of N-benzenesulfonyl-N'-ethylcarbodiimide, B.P. 139–144° C. (0.2 mm.).

Analysis.—Calcd. for $C_9H_{10}N_2O_2S$: C, 51.41; H, 4.79; N, 13.32. Found: C, 51.37; H, 4.80; N, 13.11.

In the same manner as shown above, N-benzenesulfonyl-N'-methylcarbodiimide, N - benzenesulfonyl - N' - propylcarbodiimide, N - benzenesulfonyl - N' - isopropylcarbodiimide, N-benzenesulfonyl-N'-isobutylcarbodiimide, N-benzenesulfonyl-N'-pentylcarbodiimide, N - benzenesulfonyl-N' - isopentylcarbodiimide, and N - benzenesulfonyl - N'-hexylcarbodiimide are prepared by substituting N-benzenesulfonyl-N'-methylthiourea, N-benzenesulfonyl-N'-propylthiourea, N-benzenesulfonyl-N'-isopropylthiourea, N-benzenesulfonyl-N'-isobutylthiourea, N - benzenesulfonyl-N'-pentylthiourea, N - benzenesulfonyl-N'-isopentylthiourea, and N-benzenesulfonyl-N'-hexylthiourea, respectively, for N-benzenesulfonyl-N'-ethylthiourea.

EXAMPLE 2

N-(4-methylbenzenesulfonyl)-N'-ethylcarbodiimide

To 7.74 g. (0.03 mole) of N-(4-methylbenzenesulfonyl)-N'-ethylthiourea in 50 ml. of dry chlorobenzene was added 3 g. (0.03 mole) of phosgene in 30 ml. of dry chlorobenzene dropwise with stirring and cooling over a period of 11 minutes at 3–4° C. After stirring for one hour at temperatures between 25–28° C., the reaction mixture was refluxed for 40 minutes with nitrogen passing through the reaction mixture. Evaporation of the chlorobenzene gave 6.6 g. of crude product which upon distillation under reduced pressure produced (40.2 percent) of N-(4-methylbenzenesulfonyl)-N'-ethylcarbodiimide, B.P. 147–151° C. (0.25 mm.).

Analysis.—Calcd. for $C_{10}H_{12}N_2O_2S$: C, 53.55; H, 5.39; N, 12.49; S, 14.30. Found: C, 53.56; H, 5.26; N, 12.62; S, 14.42.

In the same manner as shown above, N-(4-ethylbenzenesulfonyl) - N' - ethylcarbodiimide, N - (3 - propylbenzenesulfonyl)-N'-ethylcarbodiimide, and N-(4-butylbenzenesulfonyl)-N'-ethylcarbodiimide are prepared by substituting N-(4-ethylbenzenesulfonyl)-N'-ethylthiourea, N-(3-propylbenzenesulfonyl)-N'-ethylthiourea, and N-(4-butylbenzenesulfonyl)-N'-ethylthiourea, respectively, for N-(4-methylbenzenesulfonyl)-N'-ethylthiourea.

EXAMPLE 3

N-(benzenesulfonyl)-N'-butylcarbodiimide

To 10.88 g. (0.04 mole) of N-benzenesulfonyl-N'-butylthiourea in 20 ml. of chlorobenzene was added 3.9 g. (0.04 mole) of phosgene in 40 ml. of dry chlorobenzene dropwise with stirring and cooling over a period of 11 minutes at 3° C. After stirring for 70 minutes at temperatures between 25–28° C., the reaction mixture was refluxed for 80 minutes at 130–132° C. while nitrogen was passed through for the first 30 minutes. A small amount of solid material was removed by filtration and evaporation of the solvent afforded 8.9 g. of crude product. Distillation under reduced pressure produced 3.8 g. (40 percent) of N-benzenesulfonyl-N'-butylcarbodiimide, B.P. 151–155° C. (0.1 mm.).

Analysis.—Calcd. for $C_{11}H_{14}N_2O_2S$: C, 55.45; H, 5.92; N, 11.75. Found: C, 55.51; H, 5.89; N, 11.70.

In the same manner as shown above, N-benzenesulfonyl-N'-cyclopentylcarbodiimide, N-benzenesulfonyl-N'-cyclohexylcarbodiimide, N - benzenesulfonyl - N' - cycloheptylcarbodiimide, and N-benzenesulfonyl-N'-cyclooctylcarbodiimide are prepared by substituting N-benzenesulfonyl-N'-cyclopentylthiourea, N-benzenesulfonyl-N'-cyclohexylthiourea, N-benzenesulfonyl-N'-cycloheptylthiourea and N-benzenesulfonyl-N'-cyclooctylthiourea, respectively, for N-benzenesulfonyl-N'-butylthiourea.

EXAMPLE 4

N-(4-methylbenzenesulfonyl)-N'-butylcarbodiimide

To 13.44 g. (0.047 mole) of N-(4-methylbenzenesulfonyl)-N'-butylthiourea in 94 ml. of dry chlorobenzene was added 4.7 g. (0.047 mole) of phosgene in 40 ml. of dry chlorobenzene dropwise with stirring and ice cooling over a period of 11 minutes at 4° C. After stirring for 10 minutes at about 40° C., nitrogen was passed through the reaction mixture and the mixture was refluxed for 70 minutes at 130–132° C. Evaporation of the chlorobenzene gave 12.3 g. of crude product. Distillation under reduced pressure produced 5.6 g. (47.3 percent) of N-(4-methylbenzenesulfonyl)-N'-butylcarbodiimide, B.P. 159–162° C. (0.2 mm.).

Analysis.—Calcd. for $C_{12}H_{16}N_2O_2S$: C, 57.12; H, 6.38; N, 11.10; S, 12.70. Found: C, 56.36; H, 6.36; N, 11.05; S, 13.17.

In the same manner as shown above, N-(4-methylbenzenesulfonyl) - N' - cyclopentylcarbodiimide, N - (4-methylbenzenesulfonyl)-N'-cyclohexylcarbodiimide, N-(4-methylbenzenesulfonyl)-N' - cycloheptylcarbodiimide, N-(4-methylbenzenesulfonyl)-N'-cyclooctylcarbodiimide, N-(4-ethylbenzenesulfonyl)-N' - cyclohexylcarbodiimide, N-(4-propylbenzenesulfonyl) - N' - cycloheptylcarbodiimide, and N-(3-butylbenzenesulfonyl)-N'-cyclooctylcarbodiimide are prepared by substituting N-(4-methylbenzenesulfonyl)-N'-cyclopentylthiourea, N - (4 - methylbenzenesulfonyl)-N'-cyclohexylthiourea, N - (4 - methylbenzenesulfonyl)-N'-cycloheptylthiourea, N - (4 - methylbenzenesulfonyl)-N'-cyclooctylthiourea, N - (4 - ethylbenzenesulfonyl)-N'-cyclohexylthiourea, N-(4-propylbenzenesulfonyl)-N'-cycloheptylthiourea, and N-(3-butylbenzenesulfonyl)-N'-cyclooctylthiourea, respectively, for N-(4-methylbenzenesulfonyl)-N'-butylthiourea.

EXAMPLE 5

N-(4-methylbenzenesulfonyl)-N'-butylcarbodiimide

To 11.54 g. (0.04 mole) of N-(4-methylbenzenesulfonyl)-N'-butylthiourea suspended in 120 ml. of carbon tetrachloride was added 8.32 g. (0.04 mole) of phosphorus pentachloride. On heating at 35° C. evolution of hydrogen chloride was observed and the phosphorus pentachloride was consumed within 15 minutes (temperature 35–47° C.). The reaction mixture was refluxed at 77–78° C. for five hours and on evaporation of the solvent and distillation under reduced pressure produced 7.7 g. (75.5 percent) of N-(4-methylbenzenesulfonyl)-N'-butylcarbodiimide, B.P. 185–186° C. (1.3 mm.).

In the same manner as shown above,

N-(3,4-dimethylbenzene-sulfonyl)-N'-butylcarbodiimide,
N-(3-chloro-4-methylbenzenesulfonyl) - N' - propylcarbodiimide,
N-(3-ethyl-4-ethoxybenzenesulfonyl)-N' - propylcarbodiimide, and
N - (3 - chloro - 4 - methoxybenzenesulfonyl) - N' - piperidinocarbodiimide are prepared by substituting N-(3,4-dimethylbenzenesulfonyl)-N'-butylthiourea,
N-(3-chloro-4-methylbenzenesulfonyl)-N'-propylthiourea,
N-(3-ethyl-4-ethoxybenzenesulfonyl)-N-¹-propylthiourea,
and N-(3-chloro-4-methoxybenzenesulfonyl)-N' - piperidinothiourea for N-(4-methylbenzenesulfonyl)-N'-butylthiourea.

EXAMPLE 6

N-(4-methylbenzenesulfonyl)-N'-butylcarbodiimide

To 11.54 g. (0.04 mole) of N-(4-methylbenesulfonyl)-N'-butylthiourea in 90 ml. of dry chlorobenzene was added 4.76 g. (0.04 mole) of thionyl chloride dropwise with cooling and stirring over a period of 3 minutes at 5–8° C. After stirring for 100 minutes at 25° C., the reaction mixture was refluxed for 90 minutes at 132–133° C. Evaporation of the chlorobenzene and distillation under reduced pressure produced 1.2 g. (11.9 percent) of N-(4-methylbenzenesulfonyl)-N' - butylcarbodiimide, B.P. 157–166° C. (0.3 mm).

EXAMPLE 7

N-(4-methylbenzenesulfonyl)-N'-hexamethyleneiminocarbodiimide

In the same manner as shown in Example 1, N-(4-methylbenzenesulfonyl) - N' - hexamethyleneiminocarbodiimide was prepared by substituting N-(4-methylbenzenesulfonyl) - N' - hexamethylene - iminothiourea for N - benzenesulfonyl - N' - ethylthiourea.

Similarly, N - (4 - methylbenzenessulfonyl) - N'-piperidinocarbodiimide, N - (4-methylbenzenesulfonyl)-N' - (4 - methylpiperidino) carbodiimide, and N-(4-methylbenzenesulfonyl) - N' - (4,4-dimethylpiperidino) carbodiimide are prepared by substituting N-(4-methylbenzenesulfonyl) - N' - piperidinothiourea,
N-(4-methylbenzenesulfonyl)-N'-(4-methylpiperidino) thiourea and N-(4-methylbenzenesulfonyl)-N'-(4,4-dimethylpiperidion)thiourea, respectively, for N-benzenesulfonyl-N'-ethylthiourea in Example 1.

EXAMPLE 8

N-(4-chlorobenzenesulfonyl)-N'-propylcarbodiimide

In the same manner as shown in Example 1, N-(4-chlorobenzenesulfonyl)-N'-propylcarbodiimide was prepared by substituting N-(4-chlorobenzenesulfonyl-N'-propylthiourea for N-benzenesulfonyl-N'-ethylthiourea.

Similarly,

N-(4-chlorobenzenesulfonyl)-N'-cycloheptylcarbodiimide,
N-(4-bromobenzenesulfonyl)-N'-cycloheptylcarbodiimide,
N-(4-chlorobenzenesulfonyl)-N'-butylcarbodiimide,
N-(4-chlorobenzenesulfonyl)-N'-methylcarbodiimide,
N-(4-bromobenzenesulfonyl)-N'-butylcarbodiimide,
N-(3-chlorobenzenesulfonyl)-N'-butylcarbodiimide,
N-(4-chlorobenzensulfonyl)-N'-hexamethyleneiminocarbodiimide, and
N-(4-chlorobenzenesulfonyl)-N'-piperidinocarbodiimide are prepared by substituting
N-(4-chlorobenzenesulfonyl)-N'-cycloheptylthiourea,
N-(4-bromobenzenesulfonyl)-N'-cycloheptylthiourea,
N-(4-chlorobenzenesulfonyl)-N'-butylthiourea,
N-(4-chlorobenzenesulfonyl)-N'-methylthiourea,
N-(4-bromobenzenesulfonyl)-N'-butylthiourea,
N-(3-chlorobenzenesulfonyl)-N'-butylthiourea,
N-(4-chlorobenzenesulfonyl)-N'-hexamethyleneiminothiourea, and
N-(4-chlorobenzenesulfonyl)-N' - piperidinothiourea, respectively, for N-benzenesulfonyl-N'-ethylthiourea in Example 1.

EXAMPLE 9

N-(4-methoxybenzenesulfonyl)-N'-cyclohexylcarbodiimide

In the same manner as shown in Example 1, N-(4-methoxybenzenesulfonyl)-N'-cyclohexylcarbodiimide was prepared by substituting N-(4-methoxybenzenesulfonyl)-N'-cyclohexylthiourea for N-benzenesulfonyl-N'-ethylthiourea.

Similarly,

N-(4-methoxybenzenesulfonyl)-N'-butylcarbodiimide,
N-(4-methoxybenzenesulfonyl)-N'-methylcarbodiimide,
N-(3-methoxybenzenesulfonyl)-N'-propylcarbodiimide,
N-(4-ethoxybenzenesulfonyl)-N'-butylcarbodiimide,
N-(3,4-dimethoxybenzenesulfonyl)-N'-pentylcarbodiimide,
N-(4-propoxybenzenesulfonyl)-N'-isobutylcarbodiimide,
N-(4-methoxybenzenesulfonyl)-N'-hexamethyleneiminocarbodiimide,
N-(4-butoxybenzenesulfonyl)-N'-ethylcarbodiimide, and
N-(4-methoxybenzenesulfonyl)-N'-piperidinocarbodiimide are prepared by substituting
N-(4-methoxybenzenesulfonyl)-N'-butylthiourea,
N-(4-methoxybenzenesulfonyl)-N'-methylthiourea,
N-(3-methoxybenzenesulfonyl)-N'-propylthiourea,
N-(4-ethoxybenzenesulfonyl)-N'-butylthiourea,
N-(3,4-dimethoxybenzenesulfonyl)-N'-pentylthiourea,
N-(4-propoxybenzenesulfonyl)-N'-isobutylthiourea,
N-(4-methoxybenzenesulfonyl)-N'-hexamethyleneiminothiourea,
N-(4-butoxybenzenesulfonyl)-N'-ethylthiourea, and
N-(4-methoxybenzenesulfonyl)-N'-piperidinothiourea, respectively, for N-benzenesulfonyl-N'-ethylthiourea in Example 1.

EXAMPLE 10

N-(4-acetylbenzenesulfonyl)-N'-cyclohexylcarbodiimide

In the same manner as shown in Example 1, N-(4-acetylbenzenesulfonyl)-N'-cyclohexylcarbodiimide was prepared by substituting N-(4-acetylbenzenesulfonyl)-N'-cyclohexylthiourea for N-benzenesulfonyl - N' - ethylthiourea.

Similarly,

N-(4-acetylbenzenesulfonyl)-N'-hexamethyleneiminocarbodiimide,
N-(4-propionylbenzenesulfonyl)-N'-piperidinocarbodiimide, N-(3-butyrylbenzenesulfonyl)-N'-propylcarbodiimide,
N-(4-acetylbenzenesulfonyl)-N'-butylcarbodiimide,
N-(4-acetylbenzenesulfonyl)-N'-methylcarbodiimide,
N-(4-acetylbenzenesulfonyl)-N'-cycloheptylcarbodiimide
and N-(4-acetylbenzenesulfonyl)-N'-cyclooctyl-
carbodiimide are prepared by substituting
N-(4-acetylbenzenesulfonyl)-N'-hexamethyleneimino-
thiourea,
N-(4-propionylbenzenesulfonyl)-N'-piperidinothiourea,
N-(3-butyrylbenzenesulfonyl)-N'-propylthiourea,
N-(4-acetylbenzenesulfonyl)-N'-butylthiourea,
N-(4-acetylbenzenesulfonyl)-N'-methylthiourea,
N-(4-acetylbenzenesulfonyl)-N'-cycloheptylthiourea, and
N-(4-acetylbenzenesulfonyl)-N'-cyclooctylthiourea, respectively, for N-benzenesulfonyl-N'-ethylthiourea in Example 1.

EXAMPLE 11

N-methylsulfonyl-N'-n-propylcarbodiimide

To 12.7 g. (0.065 mole) of N-methylsulfonyl-N'-n-propylthiourea in 87 ml. of dry chlorobenzene was added 6.5 g. (0.065 mole) of phosgene in 40 ml. of dry chlorobenzene with cooling and stirring over a period of 17 minutes at 3–4° C. After stirring for 30 minutes while the temperature was allowed to come to 20° C., the reaction mixture was refluxed for 30 minutes at 130° C. with nitrogen passing through the reaction mixture to remove traces of phosgene. Evaporation of the chlorobenzene afforded 11 g. of crude product which was distilled under reduced pressure to afford 7.7 g. (73.3%) of N-methylsulfonyl-N'-n-propylcarbodiimide, B.P. 93° C. (0.25 mm.).

*Analysis.*—Calcd. for $C_5H_{10}N_2O_2S$: C, 37.02; H, 6.21; N, 17.26. Found: C, 37.58; H, 6.30; N, 17.37.

In the same manner as shown above, N-ethylsulfonyl-N'-methylcarbodiimide, N-propylsulfonyl-N'-propylcarbodiimide, N-butylsulfonyl-N'-butylcarbodiimide, N-pentylsulfonyl-N'-ethylcarbodiimide, N-hexylsulfonyl-N'-hexylcarbodiimide are prepared by substituting N-ethylsulfonyl-N'-methylthiourea, N-propylsulfonyl-N'-propylthiourea, N-butylsulfonyl-N'-butylthiourea, N-pentylsulfonyl-N'-ethylthiourea and N-hexylsulfonyl-N'-hexylthiourea for N-methylsulfonyl-N'-n-propylthiourea.

EXAMPLE 12

N-methylsulfonyl-N'-n-butylcarbodiimide

To 10.5 g. (0.05 mole) of N-methylsulfonyl-N'-n-butylthiourea in 65 ml. of dry chlorobenzene was added 5 g. (0.05 mole) of phosgene in 40 ml. of dry chlorobenzene with stirring over a period of 17 minutes at 5° C. After stirring for one hour at a temperature of about 25° C., the reaction mixture was refluxed at 130° C. for 30 minutes with nitrogen passing through to remove unreacted phosgene. Evaporation of the chlorobenzene afforded 9.6 g. of crude product which upon distillation under reduced pressure gave 7 g. (79.5%) of N-methylsulfonyl-N'-n-butylcarbodiimide, B.P. 103–105° C. (0.3 mm.).

*Analysis.*—Calcd. for $C_6H_{12}N_2O_2S$: C, 40.89; H, 6.86; N, 15.90. Found: C, 41.17; H, 6.77; N, 16.12.

In the same manner as shown above, N-methylsulfonyl-N'-cyclopentylcarbodiimide, N-ethylsulfonyl-N'-cycloheptylcarbodiimide, N-propylsulfonyl-N'-piperidinocarbodiimide, N-butylsulfonyl-N'-hexamethyleneiminocarbodiimide and N-hexylsulfonyl-N'-(4,4-dimethylpiperidino)carbodiimide are prepared by substituting N-methylsulfonyl-N'-cyclopentylthiourea, N-ethylsulfonyl-N'-cycloheptylthiourea, N-propylsulfonyl-N'-piperidinothiourea, N-butylsulfonyl-N'-hexamethyleneiminothiourea and N-hexylsulfonyl-N'-(4,4-dimethylpiperidino)thiourea for N-methylsulfonyl-N'-n-butylthiourea.

The sulfonylcarbodiimides are valuable medicaments and, more particularly, are suitable as the active ingredient in blood sugar reducing compositions, more particularly, in unit dosage compositions for the treatment of blood sugar disorders of animals. The blood sugar reducing activities of compounds such as N-(4-methylbenzenesulfonyl)-N'-butylurea, N-(4-chlorobenzenesulfonyl)-N'-propylurea, N-(4-aminobenzenesulfonyl)-N'-butylurea are well known. Particularly contemplated are sulfonylcarbodiimides having the formula:

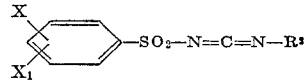

(III)

wherein X and $X_1$ have the values represented above and $R^2$ represents alkyl of two to six carbon atoms, inclusive, e.g., ethyl, propyl, isopropyl, isobutyl, butyl, hexyl, and the like, cycloalkyl of five to eight carbon atoms, inclusive, e.g., cyclopentyl, cyclohexyl, cycloheptyl, cyclooctyl, and the like, and

which represents a saturated heterocyclic amino selected from the group consisting of unsubstituted and mono- and polyalkyl substituted piperidino and hexamethyleneimino wherein each alkyl is of one to four carbon atoms, inclusive, also possess such desirable properties. Representative saturated heterocyclic amino radicals include, e.g. piperidino, hexamethyleneimino, 2-methylpiperidino, 3-methylpiperidino, 4-methylpiperidino, 2-butylpiperidino, 2-propylpiperidino, 4-isopropylpiperidino, 3,4-diethylpiperidino, and the like. For the treatment of diabetes, these compounds are useful perorally and for this purpose the active compounds are used alone or admixed with a pharmaceutically acceptable carrier.

For such oral administration, the active compounds can be administered in liquid or solid dosage forms. Solid forms include capsules, tablets, powders, granules, pills, soluble elastic capsules or suitably sealed hard gelatin or methylcellulose capsules, and the like. Liquid forms include nonaqueous dispersions such as in glycols (propylene glycol, lower molecular weight polyethylene glycols, etc.) and edible oils, mixtures of these, and the like, and oil suspensions and solutions in edible oils such as corn oil, cottonseed oil, coconut oil, peanut oil, sesame oil, or mixtures of these, and the like. Dispersions in other non-toxic pharmaceutically acceptable liquid vehicles such as glycerol, sorbitol, and the like, or combinations of these liquid vehicles can also be employed. Suitable flavors, preservatives, dispersing agents and stabilizers can also be added.

For preparing compositions such as tablets and other compressed formulations, the compositions can include any compatible and edible tableting material used in pharmaceutical practice such as corn starch, lactose, dicalcium phosphate, stearic acid, magnesium stearate, talc, methyl cellulose, as well as natural and synthetic gums, and the like.

Similarly, the compositions of the present invention can be mixed with suitable adjuvants for the preparation of resorbable hard or soft gelatin or methylcellulose capsules utilizing conventional pharmaceutical practices. To improve blood level, surfactants such as polysorbate 80 and dioctyl sodium sulfo-succinate can be added. The hard capsules are advantageously hermetically sealed against leakage and moisture from the air.

The optimum dosage of the compositions of the present invention for the treatment of diabetes depends on the age, weight, and condition of the patient being treated. Generally speaking, the preferred unit dosage is 15 to 500 mg. of active compound, usually admixed with a pharmaceutical diluent. One or two unit dosages are given one to four times a day. A total daily dose of from 60 to 4000 mg. given in a single dose, or preferably in divided doses, embraces the effective range of the treatment of diabetes.

The following compositions are within the scope of the present invention.

(1) Hard capsules.—10,000 two-piece hard methylcellulose capsules for oral use, each containing 500 mg. of N′-(4-methylbenzenesulfonyl)-N′-butylcarbodiimide and 25 mg. polysorbate 80 were prepared from the following amounts and types of materials:

| | Gm. |
|---|---|
| N-(4-methylbenzenesulfonyl)-N′-butylcarbodiimide | 5000 |
| Polysorbate 80 | 250 |
| Corn starch | 1616 |
| Mineral oil, U.S.P. | 129.6 |
| Magnesium stearate, powder | 162 |
| Talc, U.S.P. | 162 |

The N-(4-methylbenzenesulfonyl)-N′-butylcarbodiimide was mixed thoroughly with the rest of the ingredients and then capsulated.

In the same manner 10,000 two-piece hard gelatin capsules containing 100 mg. of N-(4-methylbenzenesulfonyl)-N′-cycloheptylcarbodiimide were prepared by substituting 1000 g. of N-(4-methylbenzenesulfonyl)-N′-cycloheptylcarbodiimide for N-(4-methylbenzenesulfonyl)-N′-butylcarbodiimide.

(2) Soft elastic capsules.—One-piece soft elastic capsules for oral use, each containing 35 mg. of N-(4-bromobenzenesulfonyl)-N′-cycloheptylcarbodiimide were prepared according to accepted pharmaceutical practice by first dispersing the active material in sufficient polyethylene glycol 400 to render the material capsulatable.

Similarly, one-piece soft elastic capsules each containing 60 mg. of N-(chlorobenzenesulfonyl)-N′-propylcarbodiimide were prepared.

(3) Oil suspension.—An oil suspension for oral use, each 5 ml. containing 250 mg. of N-(4-methoxybenzenesulfonyl)-N′-butylcarbodiimide, was prepared from the following types and amounts of materials:

| | |
|---|---|
| Saccharin sodium _____gm__ | 10 |
| Cyclamate sodium (sodium cyclohexylsulfamate) _____gm__ | 2.5 |
| N-(4-methoxybenzenesulfonyl) N′-butylcarbodiimide _____gm__ | 500 |
| Benzoic acid, powder _____gm__ | 10 |
| Methylparaben _____gm__ | 10 |
| Butylated hydroxyanisole _____gm__ | 1 |
| Oil of orange _____ml__ | 25 |
| Aluminum monostearate-corn oil gel to make 10,000 ml. | |

In the same manner, an oil suspension containing 100 mg. of N-(4-methylbenzenesulfonyl)-N′-cyclohexylcarbodiimide in each 5 ml. of suspension was prepared by substituting 200 g. of N-(4-methylbenzenesulfonyl)-N′-cyclohexylcarbodiimide for N-(4-methoxybenzenesulfonyl)-N′-butylcarbodiimide.

Similarly, an oil suspension containing 100 mg. of N-(4-chlorobenzenesulfonyl)-N′-cycloheptylcarbodiimide in each 5 ml. of suspension was prepared by substituting N-(4-chlorobenzenesulfonyl)-N′-cycloheptyl-carbodiimide for N-(4-methoxybenzenesulfonyl)-N′-butylcarbodiimide.

Adult dose is one or two teaspoonfuls (5–10 ml.), one to three times a day.

(4) Tablet.—10,000 oral tablets each containing 100 mg. of N-(4-bromobenzenesulfonyl)-N′-cycloheptylcarbodiimide were prepared from the following types and amounts of materials:

| | Gm. |
|---|---|
| N-(4-bromobenzenesulfonyl)-N′-cycloheptylcarbodiimide | 1000 |
| Dicalcium phosphate | 3050 |
| Starch | 65 |
| Talc, bolted | 450 |
| Calcium stearate, fine powder | 35 |

The finely powdered N-(4-bromobenzenesulfonyl)-N′-cycloheptylcarbodiimide, dicalcium phosphate, starch, talc and calcium stearate were mixed well and slugged. The slugs were forced through a No. 8 screen and the granules slugged again. These were forced through a No. 12 screen and the resulting granules compressed into tablets containing 100 mg. of the active material per tablet.

In the same manner, 10,000 tablets of N-(4-methylbenzenesulfonyl)-N′-butylcarbodiimide were prepared, containing 500 mg. of active ingredient per tablet, by substituting 5000 g. of N-(4-methylbenzenesulfonyl)-N′-butylcarbodiimide for N-(bromobenzenesulfonyl)-N′-cycloheptylcarbodiimide.

Also, 10,000 tablets of N-(4-chlorobenzenesulfonyl)-N′-propylcarbodiimide were prepared, containing 200 mg. of active ingredient per tablet, by substituting 2000 g. of N-(4-chlorobenzenesulfonyl)-N′-propylcarbodiimide for N-(4-bromobenzenesulfonyl)-N′-cycloheptylcarbodiimide.

(5) Soft elastic capsules.—One-piece soft elastic capsules for oral use, each containing 500 mg. of N-(4-methylbenzenesulfonyl)-N′-butylcarbodiimide liquid were prepared directly without prior dilution.

Similarly, one-piece soft elastic capsules containing 150 mg. of N-(4-methylbenzenesulfonyl)-N′-cycloheptylcarbodiimide or 100 mg. of N-(4-methylbenzenesulfonyl)-N′-hexamethyleneiminocarbodiimide were prepared.

(6) Drop dosage form.—A liquid concentrate for oral use, each ml. containing 100 mg. of N-(4-bromobenzenesulfonyl)-N′-cycloheptylcarbodiimide was prepared from the following materials:

| | |
|---|---|
| Saccharin sodium _____gm__ | 1 |
| Cyclamate sodium _____gm__ | 10 |
| N-(4-bromobenzenesulfonyl)-N′-cycloheptylcarbodiimide | 100 |
| Oil of peppermint _____ml__ | 2.5 |
| Polyethylene glycol 400 to make 1000 ml. | |

In the same manner, a liquid concentrate containing 500 mg. of N-(4-methylbenesulfonyl)-N′-butylcarbodiimide in each ml. was prepared by substituting 500 g. of N-(4-methylbenzenesulfonyl)-N′-butylcarbodiimide for N-(4-bromobenzenesulfonyl)-N′-cycloheptylcarbodiimide.

Also, a liquid concentrate containing 200 mg. of N-(4-chlorobenzenesulfonyl)-N′-propylcarbodiimide in each ml. was prepared by substituting 200 g. of N-(4-chlorobenzenesulfonyl)-N′-propylcarbodiimide for N-(4-bromobenzenesulfonyl)-N′-cycloheptylcarbodiimide.

We claim:
1. An oral composition effective for the treatment of diabetes containing as an active ingredient from about 15 mg. to about 500 mg. of a sulfonylcarbodiimide having the following formula:

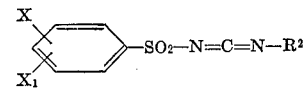

wherein X and $X_1$ are selected from the group consisting of hydrogen, alkyl of one to four carbon atoms, inclusive, alkoxy of one to four carbon atoms, inclusive, halogen, and alkanoyl of two to four carbon atoms, inclusive, $R_2$ is selected frm the group consisting of alkyl of two to six carbon atoms, inclusive, cycloalkyl of five to eight carbon atoms, inclusive, and

which is selected from the group consisting of unsubstituted and mono- and polyalkyl substituted piperidino and hexamethyleneimino wherein each alkyl is of one to four carbon atoms, inclusive, and a diluent amount of a pharmaceutically acceptable carrier.

2. An oral composition according to claim 1 containing as an active ingredient from about 15 mg. to about 500 mg. of N-(4-methylbenzenesulfonyl)-N'-butylcarbodiimide and a diluent amount of a pharmaceutically acceptable carrier.

References Cited

UNITED STATES PATENTS 2,907,697  10/1959  Haack et al. _____ 167—65
2,964,560  12/1960  Haack et al. _____ 167—65
2,968,158  1/1961   Ruschig et al. _____ 167—65
3,063,903  11/1962  Wright _____ 167—65

ALBERT T. MEYERS, *Primary Examiner.*

J. GOLDBERG, *Assistant Examiner.*

U.S. Cl. X.R.

424—244, 267

UNITED STATES PATENT OFFICE
CERTIFICATE OF CORRECTION

Patent No. 3,422,201                                                 January 14, 1969

Adnan A. R. Sayigh et al.

It is certified that error appears in the above identified patent and that said Letters Patent are hereby corrected as shown below:

Column 1, lines 32 to 35, the formula should appear as shown below:

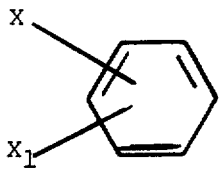

same column 1, lines 47 and 48, cancel "500 milligrams of a benzenesulfonyl carbodiamide to-hexyl, and the like" and insert -- , hexyl --; line 61, "4-isoproylpiperidino" should read -- 4-isopropylpiperidino --; line 62, "3,4-diethyliperidino" should read -- 3,4-diethylpiperidino --. Column 5, line 33, "-N$^1$-" should read -- -N$'$- --; line 60, "benzenessulfonyl" should read -- benzenesulfonyl --. Column 9, line 3, "N/-" should read -- N- --; line 29, "N-(chloro" should read -- N-(4-chloro --. Column 10, line 7, "N-(bromo" should read -- N-(4-bromo --; line 31, "100" should read -- 100 gm. --; line 60, "R$_2$" should read -- R$^2$ --; line 61, "frm" should read -- from --. Column 11, line 7, "2,907,697" should read -- 2,907,692 --.

Signed and sealed this 7th day of April 1970.

(SEAL)
Attest:

EDWARD M. FLETCHER, JR.                                      WILLIAM E. SCHUYLER, JR.
Attesting Officer                                                         Commissioner of Patents